(12) United States Patent
Yu (10) Patent No.: US 7,361,725 B2
(45) Date of Patent: Apr. 22, 2008

(54) PROCESS OF PRODUCING LOW MOLECULAR WEIGHT POLY(HYDROXYALKANOATE)S FROM HIGH MOLECULAR WEIGHT POLY(HYDROXYALKANOATE)S

(76) Inventor: Ga-Er Yu, 19482 Elkas Boulevard, Kirkland, Quebec (CA) H9J 3L3

( * ) Notice: Subject to any disclaimer, the term of this patent is extended or adjusted under 35 U.S.C. 154(b) by 0 days.

(21) Appl. No.: 11/129,479

(22) Filed: May 16, 2005

(65) Prior Publication Data

US 2005/0260723 A1 Nov. 24, 2005

Related U.S. Application Data

(60) Provisional application No. 60/571,857, filed on May 18, 2004.

(51) Int. Cl.
*C08G 63/00* (2006.01)
*C08F 20/06* (2006.01)
*C07C 67/00* (2006.01)

(52) U.S. Cl. .................... 528/271; 526/317.1; 560/216
(58) Field of Classification Search ................. 560/179, 560/180, 190, 205
See application file for complete search history.

(56) References Cited

U.S. PATENT DOCUMENTS

| | | | |
|---|---|---|---|
| 5,191,016 A | 3/1993 | Yalpani | |
| 5,268,422 A * | 12/1993 | Yalpani | 525/54.2 |
| 5,665,831 A | 9/1997 | Neuenschwander et al. | |
| 6,534,599 B2 * | 3/2003 | Marchessault et al. | 525/450 |

OTHER PUBLICATIONS

Lehrle et al., Thermal Degradation of Bacterial Poly(hydroxybutyric acid): Mechanisms from the Dependence of Pyrolysis Yields on Sample Thickness, Macromolecules, 1994, 27, 3782-3789.*

N. Grassie et al, "The Thermal Degradation of Poly((D)-.beta.-Hydroxybutyric Acid): Part 1-Ident. & Quant. Analysis of Products", Elsevier, Eng., 1984, pp. 47-61.

N. Grassie et al, "The Thermal Degradation of Poly(-(D)-.beta.-Hydroxybutyric Acid: Part 2-Changes in Molecular Weight", Elsevier, Eng., 1984, pp. 96-103.

N. Grassie et al, "The Thermal Degradation of Poly(-(D)-.beta.-Hydroxybutyric Acid): Part 3-The Reaction Mechanism", Elsevier, Eng., 1984, pp. 127-134.

M. Kunioka et al, "Thermal Degradation of Microbial Copolyesters . . . ", American Chemical Society, 1990, pp. 89-92.

S. Coulombe et al, "High Pressure Liquid Chromatography . . . " Macromolecules, 11, pp. 279-280 (1978).

H. Morikawa et al, "Pyrolysis of Bacterial Polyalkanoates", Can. J. Chem., 59, pp. 2306-2313 (1981).

G.E. Yu et al, "Characterisation of low molecular weight . . . ", Polymer, 2000, 41, 1087-1098.

S. Nguyen et al, "Thermal Degradation of Poly(3-hydroxyalkanoates) . . . ", Biomacromolecules, 2002, 3(1), 219.

* cited by examiner

*Primary Examiner*—Karl Puttlitz

(57) ABSTRACT

In this invention, a process of thermal degradation of biodegradable bacterial polyesters poly(hydroxyalkanoate)s (PHAs) to lower molecular weight PHAs in controllable manner has been developed. The process involves using at least one additional component to 'dilute' the PHAs in the thermal degradation process, so that the process can be controlled in the senses of better heat transfer, better stirring, easier working up after the reaction. The relationship of processing time and the molecular weights of the products at a certain temperature was obtained so that it is possible to obtain the desired molecular weight products in the real production under the guidance of the relationship.

19 Claims, 6 Drawing Sheets

PROCESS OF PRODUCING LOW MOLECULAR WEIGHT POLY(HYDROXYALKANOATE)S FROM HIGH MOLECULAR WEIGHT POLY(HYDROXYALKANOATE)S

CROSS REFERENCE TO RELATED APPLICATIONS

The present invention claims the benefit of the filing date of U.S. Provisional Application No. 60/571,857, filed in May 18, 2004.

BACKGROUND OF THE INVENTION

1. Field of the Invention

This invention relates to the process of preparation of low molecular weight poly(hydroxyalkanoate)s (PHA) from high molecular weight PHAs by thermal degradation method in a controllable manner. Typical examples are such as thermal degradation of poly((R)-3-hydroxybutyrate) (PHB), poly((R)-3-hydroxybutyrate-co-3-hydroxyvalerate) (PHB/V). This process is suitable for scaling up to industrial production of specified molecular weight polymers of polyester type polymers from their higher molecular weight polymers. It is a typical example of thermal degradation of a bacterial high molecular weight PHA to a desired low molecular weight PHA. In the process, a second component with a high boiling point is used as a 'solvent' or 'additive' or 'diluter'. So that the system has better heat transfer, stirring and easier work up after the reaction finishes. The process will produce low molecular weight PHAs for the application such as nano and microspheres used in different areas, such as drug delivery systems, drug coating systems. The low molecular weight PHAs produced in this invention process usually possess functional groups of carboxylic acid end, which can be used for the application of making copolymers of PHA with other components for many different applications such as biodegradable and biocompatible adhesives, drug delivery systems, drug coating systems, and the copolymers could be useful as tissue engineering materials and blending materials for biodegradable materials.

2. Description of Prior Art

PHA (polyhydroxyalkanoate) is a general nomenclature for a class of biopolymers and copolymers originally produced by bacterials. PHA is semicrystalline thermoplastics, ranging from around 70% crystallinity to very low crystallinity. They have the following generic structure:

R can be hydrogen or hydrocarbon chains of up to around C13 in length, and x can range from 1 to 3 or more.

When R is a methyl group and x=1, the polymer is poly(3-hydroxybutyric acid) or poly(3-hydroxybutyrate) (PHB), the basic homopolymer in the PHA family. When R is a ethyl group and x=0.1, the polymer is poly(3-hydroxyvalerate) PHV. Copolymers of PHB/V with different compositions are often produced to control to the melting points and other properties. The polymers of PHA with R≧1 and x=1, produced by bacteria in nature and in industrial controlled fermentation, have a chiral centre. These PHAs are optically active. These polymers are poly((R)-3-hydroxyalkanoate)s, and their structures are illustrated as follows.

Scheme 1

Where R1 and R2 can be $CH_3$ or $CH_3$ and $CH_2CH_3$ respectively or other substitutes, etc. If R1=R2=$CH_3$, the polymer is Poly((R)-3-hydroxybutyrate), or PHB. If R1=$CH_3$ and R2=$CH_2CH_3$, the random copolymer is Poly((R)-3-hydroxybutyrate/valerate), or PHB/V.

PHB and PHB/V are the most common polymers of PHA.

PHAs are biocompatible and biodegradable polymers. Progress in understanding the structure-property relation of bacterially produced poly((R)-3-hydroxyalkanoate)s and their copolymers PHB/Vs is summarized in recent reviews (Marchessault, R. H.; Yu, G.-E., Chapter 17 Crystallization and Material Properties of PHAs, in *Handbook of Biopolymers*, vol. 5, edited by A. Steinbuchel and Y. Doi, Wiley/VCH Publishers, 2001).

PHB and its copolymers, e.g., PHB/V, can be degraded by purified bacterial enzymes. PHB and its copolymers can also be hydrolysed in acidic and basic conditions, just like normal esters. The study of the hydrolysis of PHB was pioneered by Lemoigne who used the result as a proof of the chemical structure of the PHB chain. Further studies of hydrolysis of PHB in base conditions and precipitation fractionation of the hydrolytic products were carried out by Hauttecoeur et al. Acidic hydrolysis of PHAs under 150° C. to generate functionalised low molecular weight PHAs as reaction blocks has also been useful (U.S. Pat. Nos. 5,268, 422 and 5,191,016). The hydrolysis of PHB in basic and acidic conditions has been reviewed in recent paper (Yu, G.-E. et al 'Characterisation of low molecular weight poly (3-hydroxybutylate)', *Polymer*, 2000, 41, 1087-1098).

High molecular weight PHAs can undergo transesterification reactions with diol to generate low molecular weight PHA diols as basic building materials of polyurethane polymers for biodegradable/medical applications (U.S. Pat. No. 5,665,831).

It is well known that PHB and its copolymers PHB/V etc can be thermally degraded. The mechanisms of thermal degradation of PHB and its copolymers are sensitive to the investigated temperature range. At moderate temperatures, it was widely accepted that the PHB was decomposed through a random scission process involving a six-membered ring ester intermediate as illustrated below.

Scheme 2

-continued

This mechanism has been well accepted to give almost exclusively an unsaturated end and a carboxylic end for another end of the products, as illustrated in scheme 3

Scheme 3

The definitions for R1 and R2 are the same as in Scheme 1.

Almost all the publications on the thermal degradation of PHA are concerned with the degradation mechanisms except one from Hoecker's group who decomposed PHB to cyclics and tried to recycle the decomposed products.

When low molecular weight samples of PHB are generated purposely by controlled thermal degradation procedure, a potential synthetic block material is produced due to there are functional ends with the obtained polymers. This has been well described in the invention (U.S. Pat. No. 6,534, 599) and literature (Sophie Nguyen, Ga-er Yu, R. H. Marchessault, Thermal Degradation of Poly(3-hydroxyalkanoates): Preparation of Well-Defined Oligomers, *Biomacromolecules*, 2002, 3(1), 219).

A possible scaling-up process for controlled thermal degradation of PHA to produce desired molecular weight PHA is needed.

SUMMARY OF THE INVENTION

It is an object of this invention to develop and provide a practically useful and efficient process of producing low molecular weight poly(hydroxybutyrate)s, or PHAs, from high molecular weight PHAs in controllable manner.

It is a further object of this invention to investigate the effects of addition of a second component or a diluter in the process.

It is a further object of this invention to access the function of the diluters in the process: the diluters make the system to have better heat transfer, lower the viscosity of the reaction system so that it is easier for stirring, and the product mixture from the process will not form a hard piece after it is cooled to room temperature, so that the work up process becomes manageable and easy.

It is an further object of this invention to investigate how addition of a diluter to the thermal degradation process allow to excellent control of the degradation to give desired molecular weight products.

DETAILED DESCRIPTION OF THE INVENTION AND PREFERRED EMBODIMENTS

As indicated in the section of the description of the prior arts, thermal degradation of polyesters, especially thermal degradation of biodegradable poly(hydroxyalkanoate)s is a known phenomenon. However, in a thermal degradation of bacterial PHA in bulk, there are difficulties in controlling the degradation rate, so that the molecular weight. It is typically difficult to stir the system during the reaction, and this causes large polydispersity of a polymer product. The further difficult problem is to work up after the thermal degradation reaction finished. Once the product material is cooled to room temperature, the material becomes a hard piece and difficult to handle. For all the reasons, a well established process to control the thermal degradation of PHA for the purpose of generating useful and well defined low molecular weight PHA with functional end groups is needed and necessary.

The thermal degradation reactions are controlled mainly by reaction temperature, heat transfer or even heating in the system, and reaction time. In this invention, the advancements are described as follows.

Reaction Temperature Range

The reaction temperature range can be chosen in a quite wide window. For example, the PHB polymers have melting temperature around 180° C. and also the polymer started to degrade once it starts to melt. In this invention, due to the addition of a diluter, or a solvent in the thermal degradation process, which is described in the following section, the polymer can be melted or solubilized or dissolved before the melting point, so that the reaction temperature can be chosen from 150° C. to 250° C., preferable range is 180 to 200° C. The main factor of selecting the reaction temperature is reaction time, the portion of added diluter in the system and how accurate molecular weight you would like to control.

Addition of a Second Component in the Process

The feature of this invention is the addition of a second component to the reaction so that the reaction process can be completely manageable in different aspects. The added second component can be understood as a diluter or a solvent for the process. The second component in this process can be generally defined as a chemically stable substance to act as a solvent or a diluter in the process of thermal degradation of high molecular weight PHAs. This second component should have high boiling point, preferable higher than 250° C. This second component should have similar density as the PHA to be processed and should be mixable with the PHAs at the process temperature, though it may not be good solvent for the PHA at low temperature. This second component can be a substance which is in solid state or in liquid state at room temperature. For further consideration, this second component is preferable to be easy to clean or washed away to separate from PHA product once the reaction finishes. The second component should have lower melting point than 120° C. The second component acts as a separator for the PHA particles or as a 'solvent', so that the mixture can be stirred in most of the time during the whole thermal degradation process. In this way, a better heat transfer can be reached. Further more, after the reaction finishes, the product mixture will become wax like or in loose solid state even at room temperature so that it can easily be broken to small pieces and re-dispersed in a solvent, which is none-solvent for PHA but a solvent for the second component added to the thermal degradation process. This makes the separation of the product from the added second component possible and easy.

Depending on the chosen processing temperature, the second component for the thermal degradation process can be diethylene glycol, tetraethylene glycol, polyethylene glycol up to molecular weight 5000. The ethylene glycol can be alpha, omega-hydoxy, di-methoxy or mono-methoxy. Other compounds such as low molecular weight propylene glycol, butylenes glycol, copolymers of propylene oxide and ethylene oxide, butylenes oxide and ethylene oxide, glycerol and some glycerol derivatives with low molecular weight, can also be used as the second component in the process. The chosen second component should fit to the standards set in last paragraph.

Figure 1:
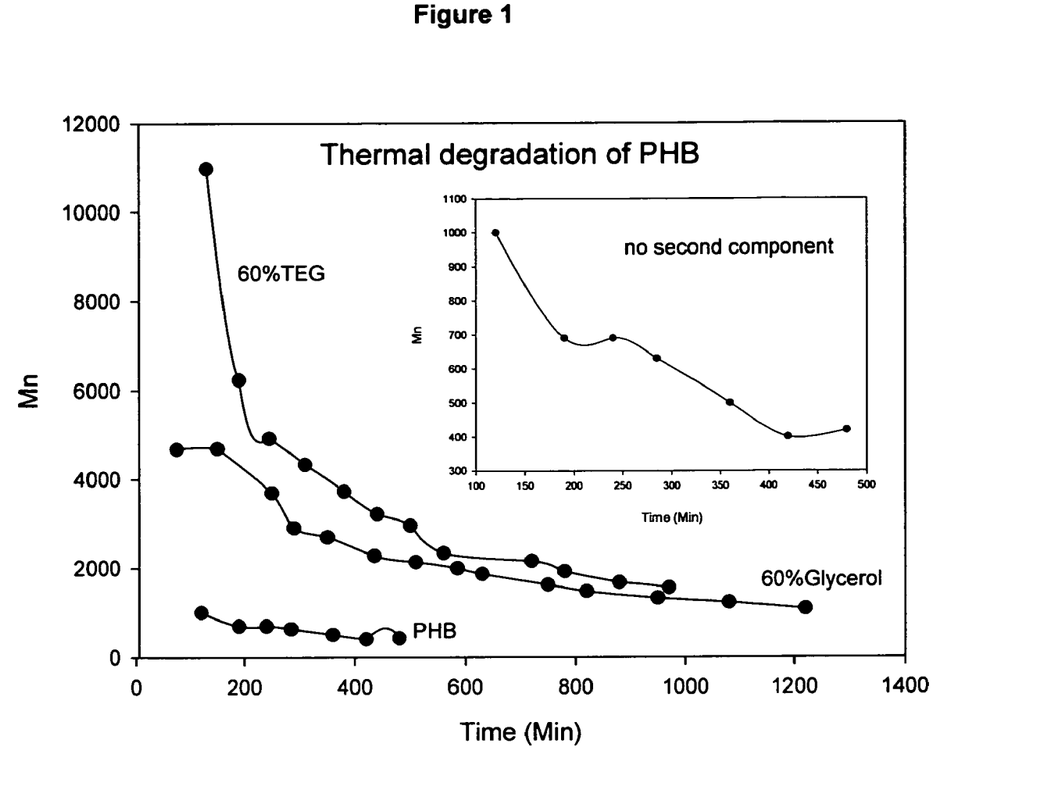
FIG. 1. The plot of product molecular weight against degradation time. The comparison of the results from the new process to the bulk process, which there is no second component added. The curve on the top is that from the process with addition of tetra(ethylene glycol) (60 wt-%), the second curve is from the process of addition of (glycerol) (60%). The curve at the bottom is from the bulk thermal degradation of PHB, and this curve was also displayed in the insert diagram. All the process was carried out at 185° C.

The advantage of using the second component can be demonstrated in FIG. 1. FIG. 1 contains the results from the thermal degradation of PHB in bulk and the results from the thermal degradation of PHB with addition of a second component at the same temperature.

In FIG. 1, it can be seen that the molecular weight of the remaining PHB in thermal degradation in bulk (without addition of a second component) becomes low very fast, or the high molecular weight PHB degraded very fast (also see the insert diagram in FIG. 1), that means the window to control the molecular weight is narrow so it is hard to control and obtain the targeted molecular weight PHAs in the bulk thermal degradation process. However, the molecular weights of the remaining PHB in the invention process with the addition of a second component drop fast at beginning but slowly in the whole process. That is to say, the window to control the molecular weight is large, so that the degradation is in a controlled manner and the desired molecular weights can be obtained in a manageable way due to a larger time scale in the new process.

Figure 2:
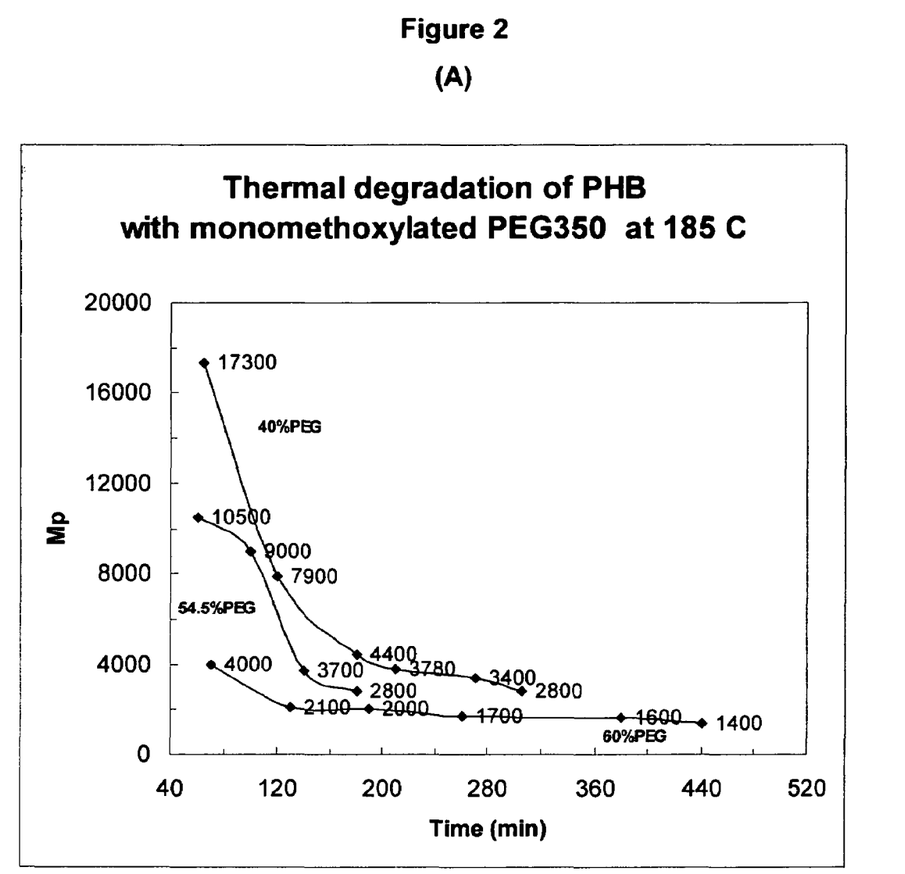
FIG. 2. The thermal degradation of PHB using the invention process with different concentration of a diluter in the system. The reaction was carried out at 185° C. (A) in this diagram, all the results are from the processes with a second component mPEG350; (B) the second component was tetra (ethylene glycol).

FIG. 2 shows the results from the processes with different concentration of a diluter: (A) with addition of methoxy poly(ethylene glycol) 350. (B) with addition of tetra(ethylene glycol). The concentration effect can be seen from both figures. It is believed that the concentration effect could be different with different added second component.

Figure 3:
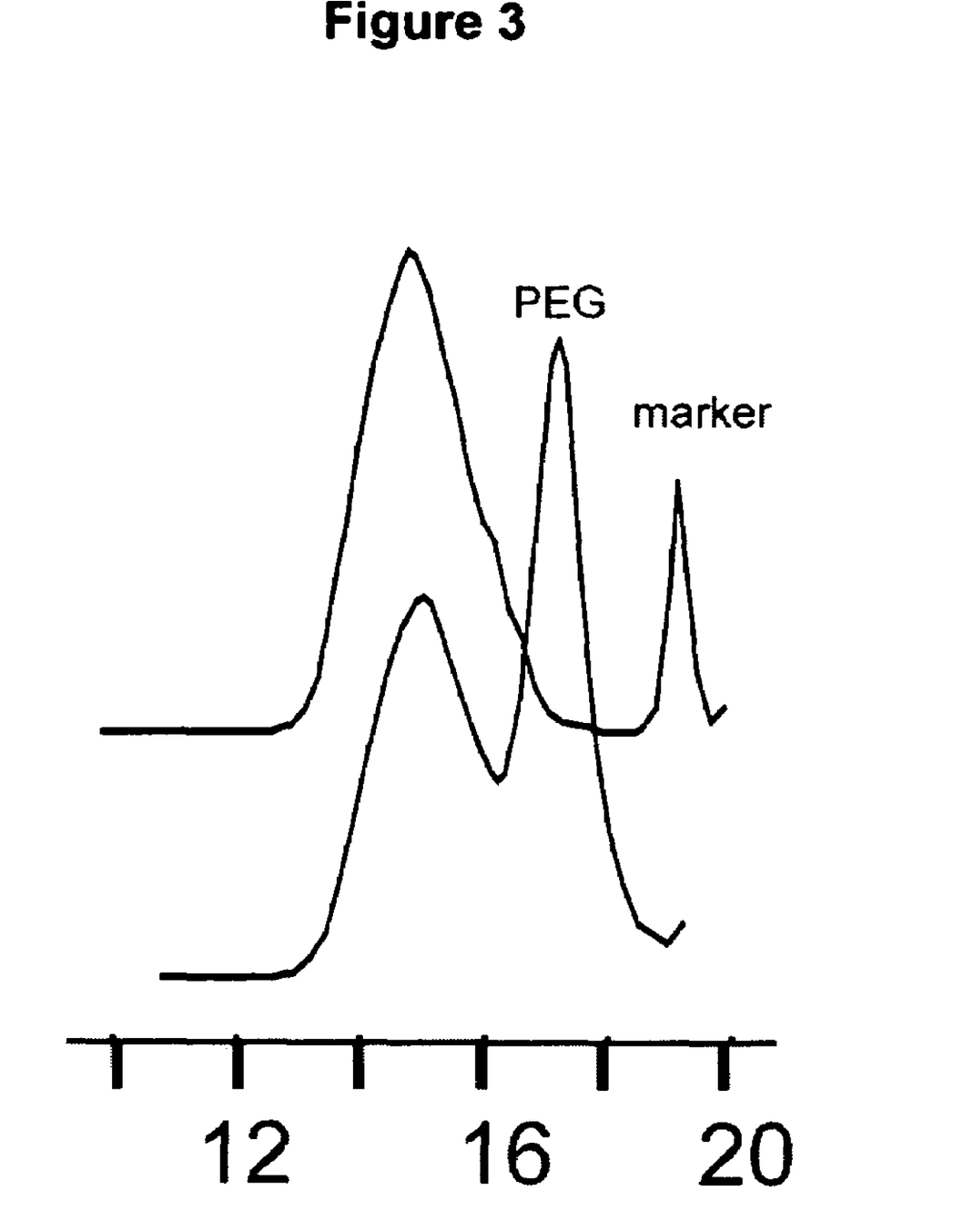
FIG. 3. The GPC curves before and after washed with water then ethanol. The bottom curve: just after the reaction with a diluter of mPEG750; the top curve: after washed. The mPEG750 peak is not seen in the top curve. The molecular weight Mw is 5000 with polydispersity of 1.26.
Figure 4:
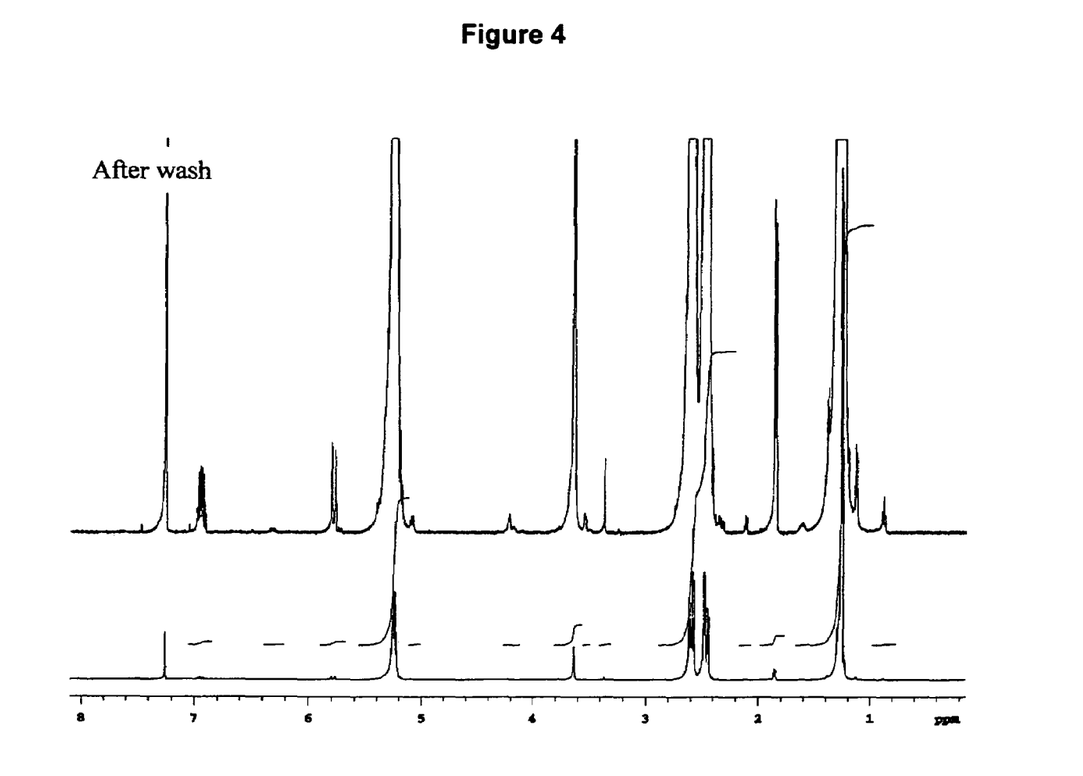
FIG. 4. $^1$H NMR (500 MHz) spectrum of the washed product shown in the FIG. 3. The spectrum shows that the structure of the product is corresponding to Scheme 3. It is also seen that a very tiny amount of mPEG750 left with the washed product (peaks at 3.82 ppm).

FIG. 3 gives a pair of GPC curves showing before and after the second component was removed. FIG. 4 is a corresponding proton NMR spectrum for the product after removal of the second component.

Reaction Time

Depending on the desired molecular weight of the product, the reaction temperature, and the concentration of the diluter in the system and the properties of the diluter (mainly the solubility or mixability of the diluter and PHA at elevated temperature), etc., the reaction time can be from minutes to hours. This has been illustrated in the diagrams and in the examples. Once the reaction temperature is set, and other conditions are set, the correlation of reaction time and molecular weight curve can be obtained and this curve can be used as a reference for the next process in the same reaction conditions. Further more, in a practical operation, under the guidance of the relation of reaction time and molecular weight of the product, once the reaction time is near the pridicted time, a sample can be taken from the reaction to obtain the product information to decide when the reaction should be stopped.

The Products and their Molecular Weight Range

The products produced from this invention process can be controlled in the range of 500 to 50000 Daltons. The polydispersity of the product molecular weight could be from 1.2 to over 2, depending on the molecular weight range. In general, lower molecular weight products have lower molecular weight polydispersities. In principle, the product should have the molecular structure as shown in Scheme 3. However, due to the process is carried at elevated temperature, and carboxylic acid end groups are generated, a proportion of products with anhydride structure could appear, this structure is shown as Scheme 4.

Scheme 4

Where the definitions of R1 and R2 are the same as in Scheme 1. So that two kinds of products are obtained in this invention process: the product has the structure as shown in scheme 3 and the product has the structure as shown in scheme 4.

A General Procedure of the Process of the Controlled Thermal Degradation of PHA in the Addition of a Second Component Based on the discussion above, a general procedure can be described for the invention process as follows.

PHA powder is weighed and added into a reactor at 100-120° C. under nitrogen atmosphere. The powder is kept at the temperature for 10 to 30 min to get rid of as much moisture as possible. The second component, a diluter, is poured into the reactor. Depending on the quantity of the diluter, the mixture can be stirred to mix. Very often the system is not able to be stirred with the magnetic stirrer. Mechanical force can be used to mix the diluter with the powder. Then the temperature is slowly raised to 150-160° C. and then to the set temperature for the thermal degradation. The reaction temperature range is 150 to 250° C. and preferable range is 180 to 200° C.

During the reaction, samples can be obtained from time to time to check the molecular weight with gel permeation chromatography (GPC). Once the desired molecular weight is reached, turn off the heater and let the system cool down or cool the system with water bath or circulation of cold water.

Once the temperature of the product mixture is cooled to under 100° C., the product mixture was poured out from the reactor to a pan or a container, preferably to an aluminum pan.

The product mixture becomes solid like stuff once it is cool. Depending on how much diluter is used and the targeted molecular weight of the product, the solid stuff can be very soft or slightly hard. The solid is always easy to break, due to there is a second component, the diluter.

The product mixture is broken to small pieces and water or methanol or ethanol is used to wash away the diluter, depending on the solubility of the diluter in water. The mixture is stirred with water for 10 to 30 min, then filtered. A blender can be used to get a quicker action on the stirring process. The product is washed and filtered 3 to 5 time. The solid is obtained and dried in air.

The dried powder is dissolved in chloroform and filtered with filter paper. Some brownish stuff will be filtered out and the clear solution is obtained. Rota-evaporate the solvent, a powder is obtained as a product. For more efficiency to get rid of the colored stuff in the product, the solution can be stirred with silica gel then filtered to obtain a clear solution and then to obtain the product.

The Application of the Products from this Invention Process

The process will produce low molecular weight PHAs for the application such as nano and microspheres used in different areas, such as drug delivery systems, drug coating systems. The process also produces functional low molecular weight PHAs, which can be used for the application of making copolymers of PHA with other components for many different applications such as biodegradable and biocompatible adhesives, drug delivery systems, drug coating systems, and the copolymers could be useful as tissue engineering materials and blending materials for biodegradable materials.

EXAMPLES

A few examples are given for better understanding the invention and these examples are illustrative only, and are not reflective of the invention as a whole.

Example 1

Controlled Thermal Degradation of PHB with Addition of Poly(Ethylene Glycol)

PHB powder (Mw ~500000) (30 g) was weighed and added into a 3-neck flask reactor (500 ml) at 110° C. under nitrogen atmosphere. The powder was kept at the temperature for 30 to 60 min. The second component, a diluter, monomethoxy poly(ethylene glycol) with molecular weight Mn=350 (20 g) was poured into the reactor. A spatula was used to assist to mix the diluter with the powder. Then the temperature can be slowly raised to 150° C. for 20 min and then to the set temperature 185° C. for the thermal degradation. Gradually, the mixture could be stirred with the magnetic stirrer. The liquid looked brownish.

During the reaction, samples were obtained from time to time to check the molecular weight with gel permeation chromatography (GPC). In this experiment, the reduction of the PHB molecular weight was recorded with the reaction time. The heater was turned off when the PHB molecular weight was reduced to about 3000. The system was left to cool down by itself.

The mixture was poured out to an aluminum pan at about 100° C. Then the solid was broken to powder and stirred with de-ionic water. After 30 min, the mixture was filtered. The solid part was stirred and washed and filtered 3 to 5 time. The solid is obtained and left in air to dry.

The pre-product was obtained.

Example 2

Controlled Thermal Degradation of PHB with Addition of Tetra(Ethylene Glycol)

PHB powder (Mw ~500000) (40 g) was weighed and added into a 3-neck flask reactor (500 ml) at 130° C. under nitrogen atmosphere. The powder was kept at the temperature for 20 min. The second component, a diluter, tetra (ethylene glycol) (60 g) was poured into the reactor. The heating temperature was set to 155° C. Once the temperature reached 155° C., it was set to 185° C. The mixture experienced hardening period due to the polymer absorbed the ethylene glycol before it started to melt. At this temperature, it took about 2 hours to completely melt the mixture and it was believed that during the melting process, the polymer had already start to degrade.

During the reaction, samples were obtained from time to time to check the molecular weight with gel permeation chromatography (GPC). In this experiment, the reduction of the PHB molecular weight was recorded with the reaction time. The heater was turned off when the PHB molecular weight was reduced to about 2000. The system was left to cool down by itself.

The mixture was poured out to an aluminum pan at about 100° C. Then the solid was broken to small lumps and stirred with de-ionic water. After 30 min, the mixture was filtered. The solid part was stirred and washed and filtered 3 to 5 time. The solid is obtained and left in air to dry.

Example 3

Controlled Thermal Degradation of PHB with Addition of Glycerol

PHB powder (Mw ~500000) (20 g) was weighed and added into a 3-neck flask reactor (500 ml) at 120° C. under nitrogen atmosphere. The powder was kept at the temperature for 20 min. The second component, a diluter, glycerol (30 g) was poured into the reactor. The temperature was set to 155° C. Once the temperature reached 155° C., it was set to 185° C. The mixture changed from paste-like to hardened piece, then started to melt.

During the reaction, samples were obtained from time to time to check the molecular weight with gel permeation chromatography (GPC). In this experiment, the reduction of the PHB molecular weight was recorded with the reaction time. The heater was turned off when the PHB molecular weight was reduced to under 2000. The system was left to cool down by itself.

The mixture was poured out to an aluminum pan at about 100° C. Then the solid was broken to powder and stirred with de-ionic water. After 30 min, the mixture was filtered. The solid part was stirred and washed and filtered 3 to 5 time. The solid is obtained and left in air to dry.

Example 4

Controlled Thermal Degradation of PHB with Addition of Tetra(Ethylene Glycol) Dimethylether PHB powder (Mw ~500000) (84 g) was weighed and added into a 3-neck flask reactor (500 ml) at 120° C. under nitrogen atmosphere. The powder was kept at the temperature for 40 min. The second component, a diluter, tetra (ethylene glycol) dimethylether (60 g) was poured into the reactor. After 30 minutes, the temperature was set to 155° C. 40 minutes later, the temperature was set to 180° C. The reaction was carried out at 180° C. for 4 hours, then it was left to cool to about 90° C. and it was poured out to an aluminum pan.

Then the solid-like stuff was broken to small lumps and stirred with de-ionic water. After 30 min, the mixture was filtered. The solid part was stirred and washed and filtered 3 to 5 time. The solid is obtained and left in air to dry.

Figure 5:
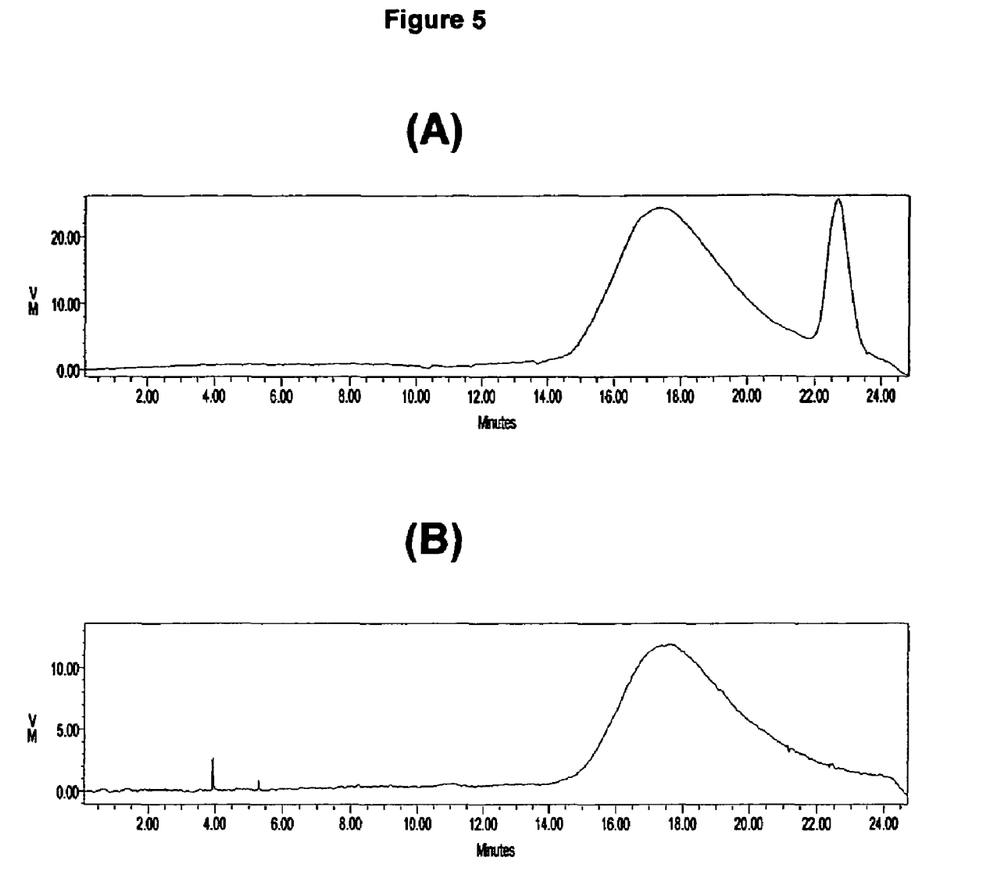
FIG. 5. The GPC curves of product of controlled thermal degradation of PHB with addition of tetra(ethylene glycol) dimethylether as diluter before and after washed with water. (A) Before wash, there are two peaks in the curve. The broad peak is from the PHB product, the second sharp peak in the later elution time is the tetra(ethylene glycol) dimethylether added to the system. (B) after wash, only the PHB product peak is seen in the curve. The tetra(ethylene glycol) dimethylether has been effective removed by washing with water. The molecular weight of the peak position is 6400 Dalton for the PHB product. The molecular weight distribution or the polydispersity of the polymer is 2.6.

In FIG. 5, the GPC curves are shown to indicate the molecular weights of the product. More importantly, the tetra(ethylene glycol) had been washed away. 75 g of the product is obtained, indicating the yield of 89 wt-%.

CONCLUSIONS

The process has been successfully developed to produce low molecular weight PHAs from high molecular weight PHAs by thermal degradation method in controlled manner. The feature of the process is addition of a second component, or a diluter, so that the system has better heat transfer, is easy to stir so that the desired molecular weight product can be produced in controlled manner. And the product yield is much higher than from the bulk thermal degradation of PHAs.

The correlation between the reaction time and molecular weight of a product can be established once the reaction temperature and the concentration of the added second component or diluter are set. The obtained relationship of the reaction time and molecular weight of a product can be a guideline to predict the time needed to obtain a product with a desired molecular weight.

While the preferred embodiment of the invention has been illustrated and described, it will be appreciated that various changes can be made therein without departing from the spirit and scope of the invention.

The invention claimed is:

1. A process for producing lower molecular weight poly (hydroxyalkanoate)s (PHAs) from a higher molecular weight poly(hydroxyalkanoate) comprising:
   providing the higher molecular weight poly(hydroxyalkanoate) in a reaction vessel,
   making an addition of a diluter to said higher molecular weight poly(hydroxyalkanoate) in said reaction vessel to form a reaction mixture of said higher molecular weight poly(hydroxyalkanoate) and said diluter in said reaction vessel,
   thermally degrading the higher molecular weight poly (hydroxyalkanoate) in said reaction mixture comprising said higher molecular weight poly(hydroxyalkanoate) and said diluter, at a thermal degradation temperature of 150° C. to 250° C., said diluter being present in said reaction mixture in a weight percentage of 5 to 95%, having a boiling point higher than 150° C., being separatable from the PHAs produced, having a melting point lower than 120° C.; and being chemically stable at said thermal degradation temperature and lowering the viscosity of the reaction mixture.

2. A process according to claim 1, wherein the produced lower molecular weight poly(hydroxyalkanoate)s (PHAs) comprise PHAs of formula:

and PHAs of formula:

where R1 and R2 are independently selected from $CH_3$ and $CH_2CH_3$ and x, y, p and q are integers indicating the number of units for a molecular weight of 500 to 50,000 Daltons.

3. A process according to claim 1, wherein the temperature is from 180 to 220° C.

4. A process according to claim 1, wherein said diluent is water soluble.

5. A process according to claim 1, wherein said diluent is alcohol soluble.

6. A process according to claim 1, wherein said diluent is acetone soluble.

7. A process for producing lower molecular weight poly (hydroxyalkanoate)s (PHAs) from a higher molecular weight poly(hydroxyalkanoate) comprising:
providing the higher molecular weight poly(hydroxyalkanoate) in a reaction vessel,
making an addition of a diluter to said higher molecular weight poly(hydroxyalkanoate) in said reaction vessel to form a reaction mixture of said higher molecular weight poly(hydroxyalkanoate) and said diluter in said reaction vessel,
thermally degrading the higher molecular weight poly (hydroxyalkanoate) in said reaction mixture comprising said higher molecular weight poly(hydroxyalkanoate) and said diluter, at a thermal degradation temperature of 150° C. to 250° C., said diluter being present in said reaction mixture in a weight percentage of 5 to 95%, and being chemically stable at said temperature and lowering the viscosity of the reaction mixture, and
wherein said diluter is selected from water soluble diluters, alcohol soluble diluters or acetone soluble diluters.

8. A process for producing lower molecular weight poly (hydroxyalkanoate)s (PHAs) from a higher molecular weight poly(hydroxyalkanoate) comprising:
providing the higher molecular weight poly(hydroxyalkanoate) in a reaction vessel,
making an addition of a diluter to said higher molecular weight poly(hydroxyalkanoate) in said reaction vessel to form a reaction mixture of said higher molecular weight poly(hydroxyalkanoate) and said diluter in said reaction vessel,
thermally degrading the higher molecular weight poly (hydroxyalkanoate) in said reaction mixture comprising said higher molecular weight poly(hydroxyalkanoate) and said diluter, at a thermal degradation temperature of 150° C. to 250° C., said diluter being present in said reaction mixture in a weight percentage of 5 to 95%, and being chemically stable at said temperature and lowering the viscosity of the reaction mixture,
wherein said diluter is selected from the group consisting of a poly(ethylene glycol) having a molecular weight of 100 to 5000 g/mol, monomethoxy poly(ethylene glycol), dimethoxy poly(ethylene glycol), tetra(ethylene glycol), methoxy tetra(ethylene glycol), tetra(ethylene glycol) dimethylether, di(ethylene glycol), di(ethylene glycol) diethyl ether, di(ethylene glycol) ethyl ether, di(ethylene glycol) dibutyl ether, di(ethylene glycol) methyl ether, di(ethylene glycol) hexyl ether, diethylene glycol monobutyl ether, diethylene glycol monoethyl ether, diethylene glycol monopropyl ether, glycerol, and poly(ethylene glycol)s based on glycerol.

9. A process according to claim 7, wherein said diluent is separatable from said PHAs.

10. A process according to claim 1, wherein said lower molecular weight poly(hydroxyalkanoate)s have a molecular weight of 500 to 50,000 Daltons.

11. A process according to claim 1, wherein said lower molecular weight poly(hydroxyalkanoate)s (PHAs) comprise polymers of formula:

wherein $R^1$ and $R^2$ are each independently selected from $CH_3$ and $C_2H_5$ and x and y are integers indicating the number of units for a molecular weight of 500 to 50,000 Daltons.

12. A process according to claim 1, wherein said lower molecular weight poly(hydroxyalkanoate)s (PHAs) comprise polymers of formula:

wherein $R^1$ and $R^2$ are each independently selected from $CH_3$ and $C_2H_5$ and x, y, p and q are integers indicating the number of units for a molecular weight of 500 to 50,000 Daltons.

13. A process according to claim 8, wherein said lower molecular weight poly(hydroxyalkanoate)s have a molecular weight of 500 to 50,000 Daltons.

14. A process according to claim 8, wherein said lower molecular weight poly(hydroxyalkanoate)s (PHAs) comprise polymers of formula:

wherein $R^1$ and $R^2$ are each independently selected from $CH_3$ and $C_2H_5$ and x and y are integers indicating the number of units for a molecular weight of 500 to 50,000 Daltons.

15. A process according to claim 7, wherein said lower molecular weight poly(hydroxyalkanoate)s have a molecular weight of 500 to 50,000 Daltons.

16. A process according to claim 7, wherein said lower molecular weight poly(hydroxyalkanoate)s (PHAs) comprise polymers of formula:

(I)

wherein $R^1$ and $R^2$ are each independently selected from $CH_3$ and $C_2H_5$ and x and y are integers indicating the number of units for a molecular weight of 500 to 50,000 Daltons.

17. A process according to claim 8, wherein the temperature is from 180 to 220° C.

18. A process according to claim 10, wherein the temperature is from 180 to 220° C.

19. A process according to claim 15, wherein the temperature is from 180 to 220° C.

* * * * *